United States Patent
Yamaji

(10) Patent No.: US 9,191,239 B2
(45) Date of Patent: Nov. 17, 2015

(54) WIRELESS COMMUNICATION DEVICE AND WIRELESS COMMUNICATION SYSTEM

(75) Inventor: Masato Yamaji, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 574 days.

(21) Appl. No.: 13/160,046

(22) Filed: Jun. 14, 2011

(65) Prior Publication Data

US 2011/0305225 A1    Dec. 15, 2011

(30) Foreign Application Priority Data

Jun. 15, 2010    (JP) ................. 2010-135973

(51) Int. Cl.
*H04W 28/14*    (2009.01)
*H04L 12/64*    (2006.01)

(52) U.S. Cl.
CPC ........... *H04L 12/6418* (2013.01); *H04W 28/14* (2013.01)

(58) Field of Classification Search
CPC .......................... H04L 12/6418; H04W 28/14
USPC ........... 370/352, 336, 328; 709/234, 219, 203
See application file for complete search history.

(56) References Cited

U.S. PATENT DOCUMENTS

2009/0279512 A1*    11/2009    Fujishima et al. ............ 370/336

FOREIGN PATENT DOCUMENTS

| EP | 1133094 A2 | 9/2001 |
|---|---|---|
| EP | 2184950 A1 | 5/2010 |
| JP | 2008-263511 A | 10/2008 |

OTHER PUBLICATIONS

Extended European Search Report issued in corresponding European application No. 11169870.0 on Aug. 12, 2011.

* cited by examiner

*Primary Examiner* — Khaled Kassim
(74) *Attorney, Agent, or Firm* — Sughrue Mion, PLLC

(57) ABSTRACT

There is provided a wireless communication device which transmits data to destination nodes by time division multiplexing. The device includes: a storage section including a transmission queue region that stores unsent data therein; a communication controller including: a communication situation evaluating section configured to evaluate a communication situation of each of the destination nodes; and a communication slot controller configure to: allocate, in the plurality of communication slots, communication slots for data transmission to the respective destination nodes, retransmission slots for retransmission of the unsent data, and auxiliary retransmission slots for retransmission of the unsent data subjected to a specified destination node, the specified destination node being determined based on the communication situation; and allocate the respective unsent data to a corresponding one of the retransmission slots and the auxiliary retransmission slots based on a given condition.

11 Claims, 9 Drawing Sheets

*FIG. 5*

TRANSMISSION QUEUE

| | |
|---|---|
| 1 | A → D (n+3) |
| 0 | A → B (n+3) |
| 1 | A → D (n+2) |
| 0 | A → C (n+2) |
| 1 | A → D (n+1) |
| 0 | A → D (n) |

FIG. 6

| DEVICE A (TRANSMITTER) | A→B | A→C | A→D | Tx Retry | Tx Retry | Tx Retry | Aux Retry | Aux Retry | Idle | Idle | Idle |
|---|---|---|---|---|---|---|---|---|---|---|---|

| DEVICE B (RECEIVER) | Rx | Idle | Idle | Rx for Retry | Rx for Retry | Rx for Retry | Idle or Rx | Idle or Rx | Idle | Idle | Idle |
|---|---|---|---|---|---|---|---|---|---|---|---|

| DEVICE C (RECEIVER) | Idle | Rx | Idle | Rx for Retry | Rx for Retry | Rx for Retry | Idle or Rx | Idle or Rx | Idle | Idle | Idle |
|---|---|---|---|---|---|---|---|---|---|---|---|

| DEVICE D (RECEIVER) | Idle | Idle | Rx | Rx for Retry | Rx for Retry | Rx for Retry | Idle or Rx | Idle or Rx | Idle | Idle | Idle |
|---|---|---|---|---|---|---|---|---|---|---|---|

WIRELESS COMMUNICATION DEVICE AND WIRELESS COMMUNICATION SYSTEM

This application claims priority from Japanese Patent Applications No. 2010-135973, filed on Jun. 15, 2010, the entire contents of which are herein incorporated by reference.

BACKGROUND

1. Technical Field

Embodiments described herein relate to a wireless communication device and a wireless communication system.

2. Related Art

A star network is a typical example of the configuration of a wireless network. FIG. 7 shows the configuration of a star network in which a device A 500a located in the middle performs wireless communication with a device B 500b, a device C 500c, and a device D 500d. As an example, the case of transmitting the data from the device A 500a to the device B 500b, the device C 500c, and the device D 500d by time division multiple access (TDMA) will be described below.

In the time division multiple access method, a fixed communication period is divided into short times (hereinafter, referred to as "communication slots") and these are assigned for communication between devices (nodes) in order to multiplex communication between the devices.

FIG. 8 is a view showing an example of allocation of communication slots in the wireless network shown in FIG. 7. In FIG. 8, "A→B" indicates a communication slot used for data transmission from the device A 500a to the device B 500b. This is the same as for "A→C" and "A→D".

Incidentally, as one of the effective methods for ensuring the communication reliability in wireless communication in which the communication path is unstable compared with that in cable communication, retransmission of data may be considered. The data retransmission is a processing of transmitting the transmission data whose communication has failed again using a communication slot set for retransmission. In the example shown in FIG. 7, a retransmission slot "Retry" which is a communication slot for data retransmission is prepared in addition to the communication slots of "A→B", "A→C", and "A→D".

The retransmission slot "Retry" is used to transmit the data again when communication of "device A→device B", "device A→device C", and "device A→device D" has failed, and is shared by "device A→device B", "device A→device C", and "device A→device D".

Generally, the number of assigned retransmission slots is determined based on the error rate of communication between devices so that the constant communication quality can be maintained in consideration of retransmission. The communication quality is ensured by reducing the number of retransmission slots when the communication situation is good, that is, when the error rate is low and on the contrary, increasing the number of retransmission slots when the communication situation is bad, that is, when the error rate is high.

It is determined whether or not the communication has succeeded by transmission of arrival acknowledgement (ACK) from a receiver to a transmitter, for example. In this case, the transmitter sets itself to a receivable state immediately after the data transmission and waits for ACK from the receiver. Then, when the ACK is received within a given time, the transmitter determines that the communication has succeeded. On the other hand, when the ACK cannot be received within a given time, the transmitter determines that a communication error has occurred and performs data retransmission using a retransmission slot. Moreover, in FIG. 8, processing of ACK is assumed to be performed in each communication slot, and thus the illustration is herein omitted.

For example, see JP-A-2008-263511.

Generally, the number of assigned retransmission slots is set such that the target data arrival rate can be ensured according to the communication environment. As examples of the setting method, there is a method of setting the number of retransmission slots in advance after estimating the error rate by performing environmental research before operating the wireless network or there is a method of setting the number of retransmission slots dynamically according to the error rate while actually operating the wireless network.

Usually, the communication error rate is not constant but changed depending on various factors, such as the influence of noise from the outside or an obstacle. In addition, an increase in the communication error caused by an obstacle, a noise source, or the like between devices is continued until the obstacle or the noise source is removed.

The unsent data is managed using a transmission queue. However, if a communication situation between certain specific devices becomes worse and a communication error occurs very frequently, a number of retransmission data addressed to the specific device are stored in the transmission queue. This may have an adverse effect on the retransmission data addressed to other devices.

FIG. 9 is a schematic view showing the situation of a transmission queue and communication slots of the device A 500a when the situation of communication from the device A 500a to the device D 500d becomes worse. In FIG. 9, a communication slot with an x-mark (cross-mark) indicates a communication slot in which communication has failed, and it is assumed that all communication of "A device→D device" has failed and each of communication of "device A→device B" and communication of "device A→device C" has failed once. FIG. 9 shows a state that no retransmission data can be transmitted even in the retransmission slot "Retry" and data remains as unsent data in the transmission queue at time T.

As shown in FIG. 9, the transmission queue is occupied by a number of retransmission data of "device A→device D", and this has an adverse effect on data retransmission of "device A→device B" and data retransmission of "device A→device C". In addition, since the size of the transmission queue is limited, the retransmission data exceeding the capacity of the transmission queue is discarded according to given rules. For this reason, the transmission data between other devices may be discarded due to the retransmission data between specific devices.

The number of retransmission slots is set such that the target data arrival rate can be ensured even in a state where the communication situation between specific devices becomes worse. In the method of setting the number of retransmission slots in advance after estimating the error rate, however, the number of retransmission slots becomes insufficient if the communication situation between the specific devices becomes worse than the initial estimation. As a result, the communication quality between other devices is adversely affected, and the target data arrival rate cannot be ensured.

In contrast, in the method of setting the number of retransmission slots dynamically according to the error rate, it is possible to increase the number of retransmission slots according to deterioration of the communication situation between specific devices. However, since there is an upper limit in the number of assignable retransmission slots, it is not possible to sufficiently prevent the deterioration of the communication situation between specific devices from imposing an adverse effect on the communication quality between other devices.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any disadvantages.

Accordingly, it is an illustrative aspect of the present invention to prevent deterioration of the communication quality between specific devices in a communication system using a time division multiple access method from imposing an adverse effect on the communication quality between other devices.

According to one or more illustrative aspects of the present invention, there is provided a wireless communication device (100) which transmits data to a plurality of destination nodes by time division multiplexing (TDM) for dividing a communication period of the data into a plurality of communication slots. The device includes: a storage section (120) including a transmission queue region (121) that stores unsent data, which have not been sent to the destination nodes, therein; a communication controller (110) comprising: a communication situation evaluating section (112) configured to evaluate a communication situation of each of the destination nodes; and a communication slot controller (111) configure to: allocate, in the plurality of communication slots, communication slots for data transmission to the respective destination nodes, retransmission slots (Retry) for retransmission of the unsent data, and auxiliary retransmission slots (AuxRetry) for retransmission of the unsent data subjected to a specified destination node, the specified destination node being determined based on the communication situation; and allocate the respective unsent data to a corresponding one of the retransmission slots and the auxiliary retransmission slots based on a given condition.

According to one or more illustrative aspects of the present invention, there is provided a wireless communication system including: a plurality of receivers (500b, 500c, 500d); and a transmitter (500a) that transmits data to the receivers by time division multiplexing (TDM) for dividing a communication period of the data into a plurality of communication slots. The transmitter includes: a storage section (120) including a transmission queue region (121) that stores unsent data, which have not been sent to the receivers, therein; a communication controller (110) comprising: a communication situation evaluating section (112) configured to evaluate a communication situation of each of the receivers; and a communication slot controller (111) configure to: allocate, in the plurality of communication slots, communication slots for transmission of the respective receivers, retransmission slots (Retry) for retransmission of the unsent data, and auxiliary retransmission slots (AuxRetry) for retransmission of the unsent data subjected to a specified receiver, the specified receiver being determined based on the communication situation; and allocate the respective unsent data to a corresponding one of the retransmission slots and the auxiliary retransmission slots base on a given condition. Each of the receivers is configured to always receive data allocated in the communication slots for data transmission to the receiver itself and data allocated in the retransmission slots for retransmission to the receiver itself. The specified receiver is configured to always receive data allocated in the auxiliary retransmission slots, in addition to data allocated in the communication slots for data transmission to the specified receiver and data allocated in the retransmission slots for retransmission to the specified receiver.

Other aspects and advantages of the present invention will be apparent from the following description, the drawings and the claims.

BRIEF DESCRIPTION OF THE DRAWINGS

FIG. 5 is a view showing another configuration of the transmission queue;

FIG. 6 is a view to explain ON/OFF control of a receiving function with respect to communication slots of a receiver;

DETAILED DESCRIPTION OF EXEMPLARY EMBODIMENTS

Figure 1:
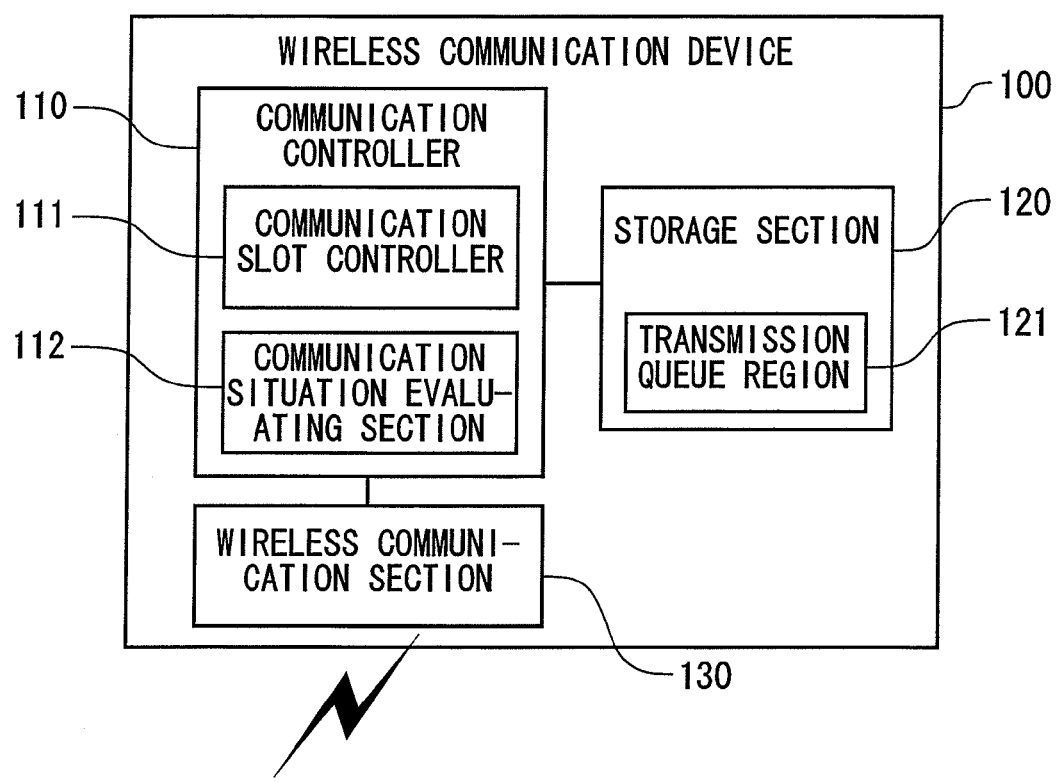
FIG. 1 is a block diagram showing the configuration of a wireless communication device according to an embodiment of the present invention.

Exemplary embodiments of the invention will be now described with reference to the accompanying drawings. FIG. 1 is a block diagram showing the configuration of a wireless communication device 100 according to the present embodiment. In addition, as shown in FIG. 7, each of a plurality of devices includes the configuration of the wireless communication device 100, and the plurality of devices form a star network.

Figure 7:
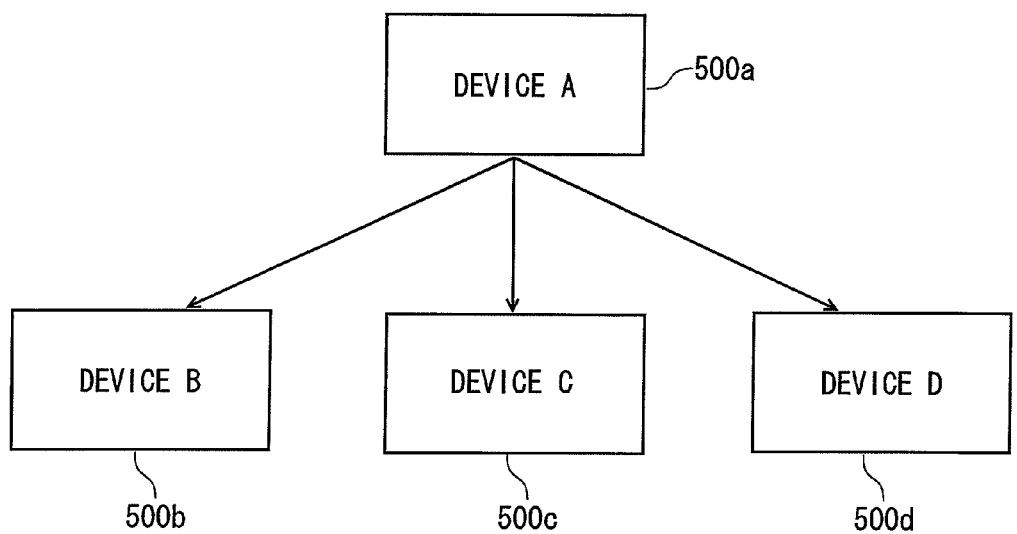
FIG. 7 is a view showing the configuration of a star network.
Figure 8:
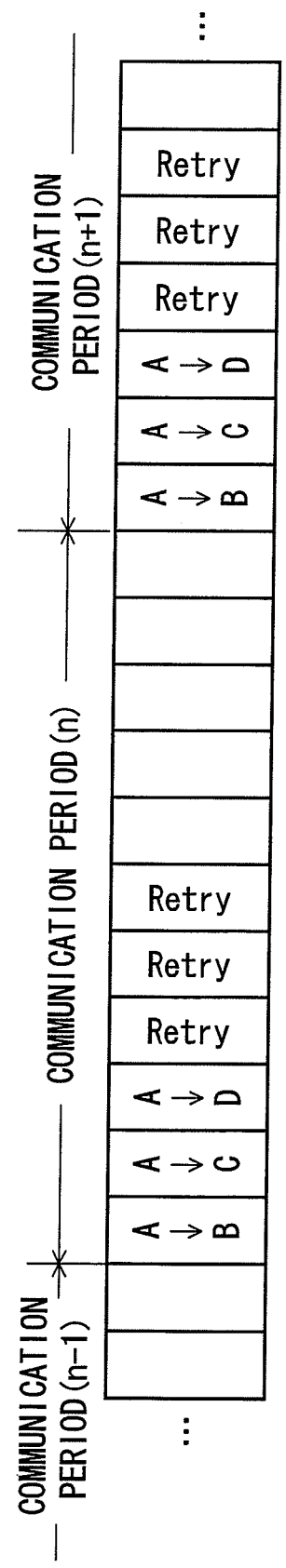
FIG. 8 is a view illustrating communication slots.

In this case, it is assumed that the wireless communication device 100 functions as the device A shown in FIG. 7 and transmits the data to the other devices B, C, and D by time division multiple access (TDMA). For example, the wireless communication device 100 is installed into various devices, such as an information processing device, a field device, a router, and a hub, and performs data communication according to each device.

As shown in FIG. 1, the wireless communication device 100 includes a communication controller 110, a storage section 120, and a wireless communication section 130. These can be formed using a CPU, a memory, a communication I/F device, and the like. The wireless communication section 130 performs wireless communication using a given protocol. A transmission queue region 121 where unsent data is stored is included in the storage section 120.

The communication controller 110 controls wireless communication processing using the wireless communication section 130. Specifically, the transmission data for each communication destination stored in the transmission queue region 121 is allocated to a communication slot corresponding to the transmission data and is output through the wireless communication section 130. In this case, the communication controller 110 evaluates the communication situation of each communication destination and allocates communication slots based on the evaluation result of communication situation.

In order to perform this processing, the communication controller 110 includes a communication slot controller 111 which controls a communication slot and a communication situation evaluating section 112 which evaluates a communication situation of each communication destination in order to determine whether or not the communication situation between specific devices has become worse.

The communication situation evaluating section 112 measures an error rate of each communication destination as the communication situation of each communication destination, for example. In this case, it is possible to determine that the communication situation of the communication destination with an error rate exceeding a given reference value has become worse. Alternatively, the number of transmission data stored in the transmission queue region 121 may be measured for each communication destination. In this case, it is possible to determine that the communication situation of the communication destination where the number of transmission data stored in the transmission queue region 121 exceeds a given reference value has become worse.

Figure 2:
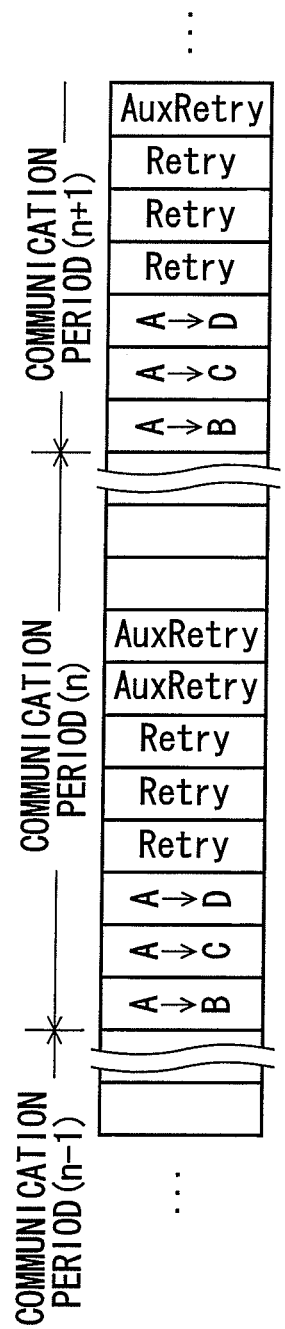
FIG. 2 is a view illustrating a communication slot allocation method according to the embodiment.

A communication slot allocation method will be now described with reference to FIG. 2. As shown in FIG. 2, in the present embodiment, not only the retransmission slot "Retry" but also an auxiliary retransmission slot "AuxRetry" is allocated as communication slots for retransmission. Accordingly, a transmission queue and a transmission queue for auxiliary retransmission slots are prepared in the transmission queue region 121.

Unlike the transmission queue, the auxiliary retransmission slot is a communication slot for retransmitting data to a device whose communication situation has become worse. By introducing such a communication slot, it is possible to prevent deterioration of the communication situation between specific devices from adversely affecting communication between other devices. As a result, performance lowering in the entire network can be avoided.

The auxiliary retransmission slot "AuxRetry" is not used when the communication error rate falls within a range of the value estimated at the time of network construction. In this case, the retransmission data is retransmitted using a retransmission slot.

In addition, for example, when the error rate between certain specific devices increases and exceeds a given reference value or when the retransmission slot "Retry" is occupied by the transmission data for a specific device, the auxiliary retransmission slot "AuxRetry" is used for communication between specific devices. Accordingly, since the retransmission data between other devices can be allocated to the retransmission slot "Retry", it is possible to prevent deterioration of the communication quality between specific devices from adversely affecting the communication quality between other devices.

In addition, the devices B, C, and D as receivers in FIG. 7 may also have the same configuration as the wireless communication device 100. However, when the devices B, C, and D are configured as receivers, the transmission queue region 121 and the communication situation evaluating section 112 are not required.

Figure 3:
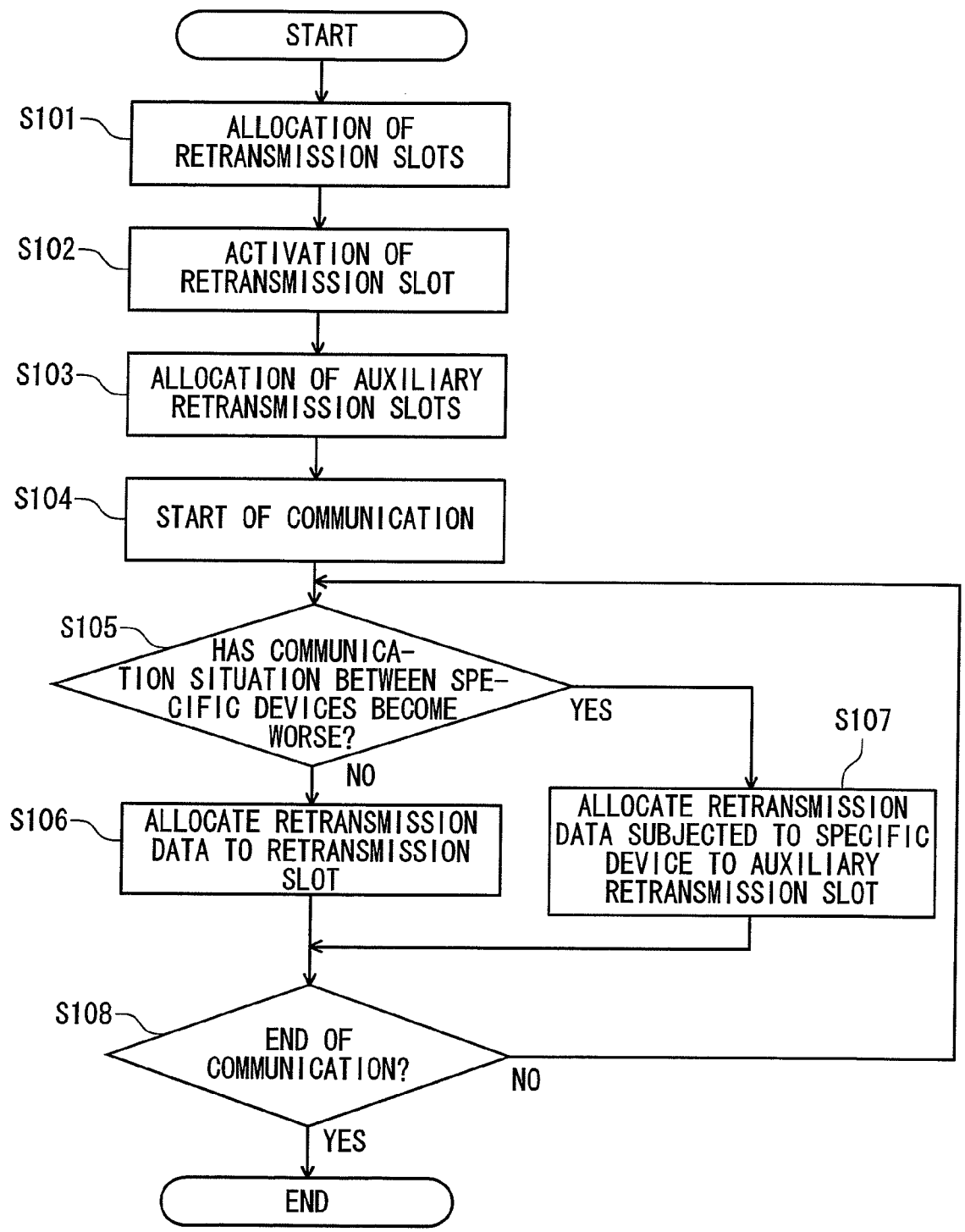
FIG. 3 is a flow chart illustrating operations of the wireless communication device according to the embodiment.

FIG. 3 is a flow chart illustrating operations of the wireless communication device 100 according to the embodiment. Firstly, a retransmission slot is allocated as a communication slot before the start of communication (S101). The allocation of retransmission slots can be performed in the same manner, and the number of the retransmission slots is set such that the target data arrival rate can be ensured. Then, the retransmission slot is enabled (S102).

Then, auxiliary retransmission slots are allocated (S103). In this stage, activation of the auxiliary retransmission slot is not necessary.

Then, a communication based on the time division multiple access method using a communication slot is started (S104). Here, it is assumed that the data is transmitted to receivers B, C, and D, respectively.

The communication situation evaluating section 112 evaluates the communication situation of each communication destination and determines whether or not the communication situation between specific devices has become worse (S105). This determination can be performed based on whether or not the error rate has exceeded a given reference value or based on whether or not the number of transmission data stored in the transmission queue region 121 has exceeded a given reference value as described above.

As a result, if the communication situation between specific devices has not become worse (S105: No), the transmission data whose communication has failed is allocated to the retransmission slot for retransmission (S106).

On the other hand, if the communication situation between specific devices has become worse (S105: Yes), the transmission data whose communication addressed to the device has failed is stored in a transmission queue for auxiliary retransmission slots and is allocated to the auxiliary retransmission slot for retransmission (S107). The transmission data whose communication addressed to other devices has failed is allocated to the retransmission slot. In addition, a plurality of devices may be allocated to an auxiliary retransmission slot.

For example, assume that a network was designed with an estimated communication error rate of 10% at the beginning, but the communication situation between specific devices has become worse and the error rate has been increased up to 30%. In this case, since the retransmission data equivalent to 20% in excess of the estimation is allocated to an auxiliary retransmission slot, the data communication can be performed without adversely affecting the retransmission slots.

The operations from step S105 shown above are repeatedly performed until the communication ends (S108). In addition, even in the case where the transmission data is allocated to an auxiliary retransmission slot if the communication situation becomes worse, the transmission data may be allocated to retransmission slots without being allocated to the auxiliary retransmission slot if the communication situation between specific devices is restored later.

Figure 4:
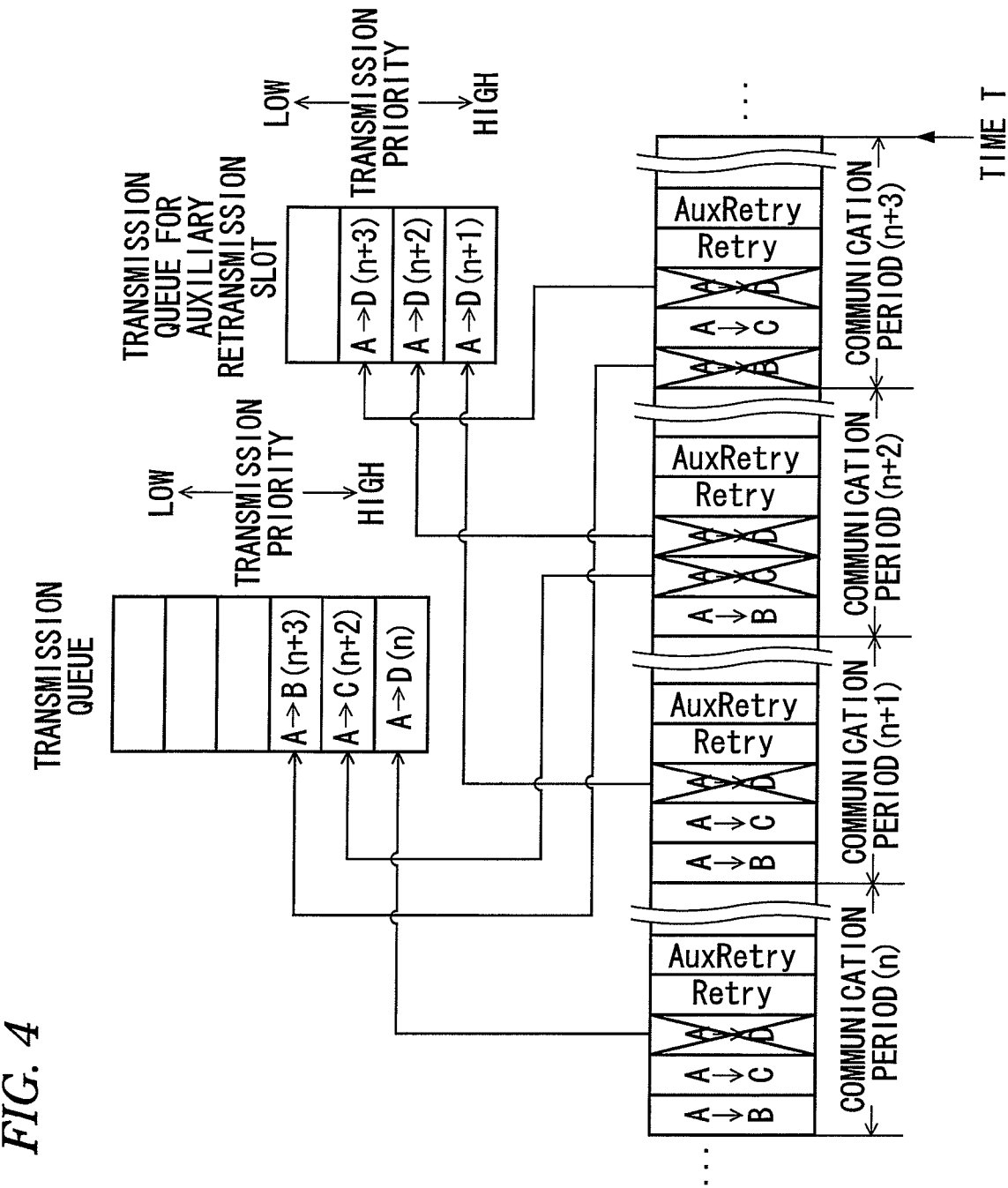
FIG. 4 is a schematic view showing the situation of a transmission queue, a transmission queue for auxiliary retransmission slots, and communication slots in the present embodiment.
Figure 9:
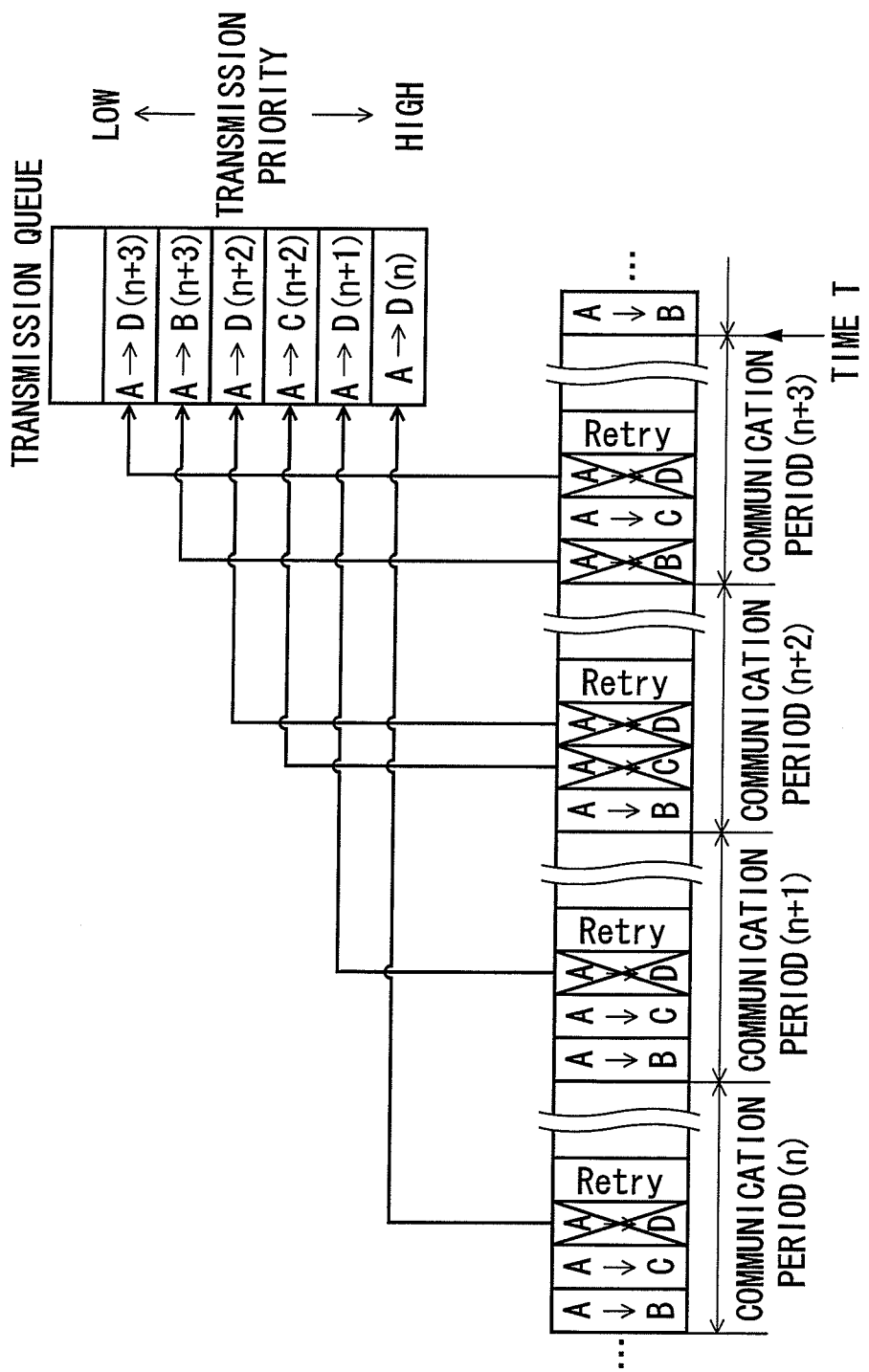
FIG. 9 is a schematic view showing the situation of a transmission queue and communication slots of a device A when the situation of communication from the device A to a device D becomes worse.

FIG. 4 is a schematic view showing the situation of a transmission queue, a transmission queue for auxiliary retransmission slots, and communication slots when the situation of communication from the device A to the device D becomes worse. Similar to FIG. 9, assume that all communication of "A device→D device" has failed and each of communication of "device A→device B" and communication of "device A→device C" has failed once. FIG. 4 shows a state that any retransmission data cannot be transmitted even in the retransmission slot "Retry" and it remains as unsent data in the transmission queue and the transmission queue for auxiliary retransmission slots at time T.

As shown in FIG. 4, even if the situation of communication from "device A→device D" becomes worse, the retransmission data of "device A→device B" and the retransmission data of "device A→device C" which remain in the transmission queue can be retransmitted using the retransmission slot.

Moreover, in this example, the transmission queue and the transmission queue for auxiliary retransmission slots are separated, but, as shown in FIG. 5, an identification flag for identifying whether or not it corresponds to retransmission or auxiliary retransmission may be set in the transmission queue so that they are distinguished from each other.

First Modification

Next, modifications of the present embodiment will be now described. First, a first modification will be described. In the embodiment described above, when the communication situation between specific devices becomes worse, data retransmission is performed using an auxiliary retransmission slot.

Since the transmitter determines whether to use an auxiliary retransmission slot, the receiver should always monitor the auxiliary retransmission slot irrespective of the communication situation. Accordingly, a receiving function of the receiver should be in the ON state. In the case of a wireless communication device operating with limited power, such as a battery, a difference of power consumption based on ON/OFF of the receiving function largely affects the operable time. For this reason, it is advantageous to set the receiving function to the OFF state if possible.

Therefore, in the first modification, only the arrangement place of an auxiliary retransmission slot of the receiver is reserved before communication, and the auxiliary retransmission slot is set to the non-used idle state so that a function as the auxiliary retransmission slot is stopped while the auxiliary retransmission slot is not used. Thus, a receiving function for the auxiliary retransmission slot can be set to OFF in the normal communication situation. As a result, power consumption of the receiver can be reduced.

FIG. 6 is a view to explain ON/OFF control of a receiving function with respect to communication slots of the receiver. In the example shown in FIG. 6, the receiver B is configured to always receive a communication slot of "A→B" assigned to itself and a retransmission slot "Retry". Moreover, for an auxiliary retransmission slot "AuxRetry", an idle state is normally set. However, only when the auxiliary retransmission slot is used, the auxiliary retransmission slot "AuxRetry" is set as an object to be received so that the power consumption can be reduced. The same control is performed for receivers C and D.

In addition, as examples of the mechanism where the receiver sets the auxiliary retransmission slot "AuxRetry" as an object to be received, there may be a wireless network managing system provided separately to control a receiver based on the communication situation or a system in which a transmitter controls a receiver based on the communication situation. In addition, the receiver itself may perform determination based on the receiving condition. In this case, for example, when data has not been received at given intervals (i.e., the regularity is broken), the receiver determines that the communication situation has become worse and sets the auxiliary retransmission slot "AuxRetry" as an object to be received.

In addition, when the communication situation is restored after setting the auxiliary retransmission slot "AuxRetry" as an object to be received, the auxiliary retransmission slot "AuxRetry" may also be excluded again from the objects to be received so that the power consumption is reduced. As examples of this mechanism, there maybe a wireless network managing system provided separately to control a receiver based on the communication situation and there may be a system in which a transmitter controls a receiver based on the communication situation. In addition, the receiver itself may perform determination based on the fact that the retransmission data is no longer transmitted through the auxiliary retransmission slot "AuxRetry", for example.

Second Modification

Next, a second modification of the present embodiment will be now described. In the second modification, the auxiliary retransmission slot "AuxRetry" is also used as a normal retransmission slot "Retry" in order to improve the data arrival rate.

That is, when a problem of power consumption, such as supply of power from the outside, does not occur, the auxiliary retransmission slot "AuxRetry" is used as the normal retransmission slot "Retry" in a state where the communication situation does not become worse. In this case, the number of retransmission slots which are available at the time of normal communication is increased. As a result, it is possible to perform communication with higher reliability than the value which is set at the time of network design in light of the data arrival rate, transmission delay, or the like.

In the second modification, when it is detected that the communication situation between specific devices has become worse, the auxiliary retransmission slot "AuxRetry" which has been used as the normal retransmission slot "Retry" is used for data retransmission between the specific devices as in the original purpose.

Third Modification

Next, a third modification will be now described. In the third modification, the auxiliary retransmission slot "AuxRetry" is also used as a normal retransmission slot in order to address the increase in a temporary communication load.

That is, when the amount of data between devices is increased in a situation where the communication situation does not become worse, a communication slot secured as the auxiliary retransmission slot "AuxRetry" is used as a communication slot for normal data communication. Accordingly, since communication slots are efficiently used, it is possible to address temporarily increased traffic without deteriorating the data arrival rate or transmission delay.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:

1. A wireless communication device which transmits data over a communications link to a plurality of destination nodes by time division multiplexing for dividing a communication period of the data into a plurality of communication slots the device comprising:
   a storage section including a transmission queue region that stores unsent data, comprising data not previously sent and data previously sent but not received, which is to be sent to the destination nodes therein;
   a communication controller comprising:
   a communication performance situation evaluating section configured to evaluate a communication performance situation of each of the destination nodes; and
   a communication slot controller configured to:
      allocate, in the plurality of communication slots, communication slots for data transmission to the respective destination nodes, retransmission slots for retransmission of the-unsent data previously sent and not received, and auxiliary retransmission slots for retransmission of the unsent data previously sent and not received to be retransmitted subjected to a specified destination node, the specified destination node being determined based on the communication performance situation; and allocate the respective unsent data previously sent and not received to a corresponding one of the retransmission slots and the auxiliary retransmission slots based on a given communication performance condition for retransmission to the destination nodes, wherein the auxiliary retransmission slot is used for retransmission to a specified destination node such that the retransmission of the unsent data previously sent and not received to the specified destination node is separate from the communication slots and retransmissions slots and does not deteriorate the communication performance situations of other destination nodes, wherein the communication performance situation evaluating section is configured to evaluate a communication error rate of each of the communication nodes, wherein the communication slot controller allocates the unsent data subjected to the specified destination node to the auxiliary retransmission slots, and the communication slot controller allocates the unsent data subjected to remaining destination nodes except the specified destination node to the retransmission slots, and wherein the communication slot controller sets a destination node whose communication error rate exceeds a threshold value as the specified destination node.

2. The device of claim 1, wherein the communication performance situation evaluating section is configured to evaluate the number of the unsent data, which is stored in the transmission queue region, for each of communication nodes, and the communication slot controller allocates the unsent data subjected to the specified destination node to the auxiliary retransmission slots, and the communication slot controller allocates the unsent data subjected to remaining destination nodes except the specified destination node to the retransmission slots, and wherein if the number of the unsent data subjected to a destination node exceeds a threshold value, the communication controller sets the destination node as the specified destination node.

3. The device of claim 1, wherein the communication slot controller is configured to employ the auxiliary retransmission slots as the communication slots or the retransmission slots if the communication performance situation meets a given communication performance condition.

4. A wireless communication system comprising:

a plurality of receivers; and a transmitter that transmits data over a communications link to the receivers by time division multiplexing for dividing a communication period of the data into a plurality of communication slots, the transmitter comprising:

a storage section including a transmission queue region that stores unsent data, comprising data not previously sent and data previously sent but not received, which is to be sent to the receivers, therein;

a communication controller comprising:

a communication performance situation evaluating section configured to evaluate a communication performance situation of each of the receivers; and a communication slot controller configure to:

allocate, in the plurality of communication slots, communication slots for transmission of the respective receivers, retransmission slots for retransmission of the unsent data previously sent and not received, and auxiliary retransmission slots for retransmission of the unsent data previously sent and not received subjected to a specified receiver, the specified receiver being determined based on the communication situation; and allocate the respective unsent data to a corresponding one of the retransmission slots and the auxiliary retransmission slots based on a given communication performance condition, and wherein each of the receivers is configured to always receive data allocated in the communication slots for data transmission to the receiver itself and data allocated in the retransmission slots for retransmission to the receiver itself, wherein the specified receiver is configured to always receive data allocated in the auxiliary retransmission slots, in addition to data allocated in the communication slots for data transmission to the specified receiver and data allocated in the retransmission slots for retransmission to the specified receiver, wherein the auxiliary retransmission slot is used for retransmission to a specified destination node such that the retransmission of the unsent data previously sent and not received to the specified destination node is separate from the communication slots and retransmissions slots and does not deteriorate the communication performance situations of other destination nodes, wherein the communication performance situation evaluating section is configured to evaluate a communication error rate of each of the communication nodes, wherein the communication slot controller allocates the unsent data subjected to the specified destination node to the auxiliary retransmission slots, and the communication slot controller allocates the unsent data subjected to remaining destination nodes except the specified destination node to the retransmission slots, and wherein the communication slot controller sets a destination node whose communication error rate exceeds a threshold value as the specified destination node.

5. The device of claim 1, wherein the transmission queue region comprises at least two queues, one for storing information for transmission in communication slots and one for storing information for transmission in auxiliary retransmission slots.

6. The device of claim 1, wherein within the transmission queue region, a single queue is operative to store information for transmission in communication slots and information for transmission in auxiliary retransmission slots, and to store identifiers with said information, that correspond to an assignment to a communication slot or auxiliary retransmission slot.

7. The system of claim 4, wherein the transmission queue region comprises at least two queues, one for storing information for transmission in communication slots and one for storing information for transmission in auxiliary retransmission slots.

8. The system of claim 4, wherein within the transmission queue region, a single queue is operative to store information for transmission in communication slots and information for transmission in auxiliary retransmission slots, and to store identifiers with said information, that correspond to an assignment to a communication slot or auxiliary retransmission slot.

9. A wireless communication device which transmits data over a communications link to a plurality of destination nodes by time division multiplexing for dividing a communication period of the data into a plurality of communication slots the device comprising:
- a storage section including a transmission queue region that stores unsent data comprising data not previously sent and data previously sent but not received, which have not been received by the destination nodes therein;
- a communication controller comprising:
- a communication performance situation evaluating section configured to evaluate a communication performance situation of each of the destination nodes; and
- a communication slot controller configured to:
- allocate, in the plurality of communication slots, communication slots for transmitting unsent data not previously sent to the respective destination nodes, retransmission slots for retransmission of unsent data previously sent but not received, and auxiliary retransmission slots for retransmission of unsent data previously sent but not received to be retransmitted subjected to a specified destination node, the specified destination node being determined based on the communication performance situation; and
- allocate the respective unsent data to a corresponding one of the retransmission slots and the auxiliary retransmission slots based on a given communication performance condition,
- wherein the auxiliary retransmission slots are only allocated to a specified destination node when a communication error rate exceeds a threshold value or acceptable range,
- wherein the auxiliary retransmission slot is used for retransmission to a specified destination node such that the retransmission of the unsent data previously sent and not received to the specified destination node is separate from the communication slots and retransmissions slots and does not deteriorate the communication performance situations of other destination nodes,
- wherein the communication performance situation evaluating section is configured to evaluate the communication error rate of each of the communication nodes,
- wherein the communication slot controller allocates the unsent data subjected to the specified destination node to the auxiliary retransmission slots, and
- the communication slot controller allocates the unsent data subjected to remaining destination nodes except the specified destination node to the retransmission slots, and
- wherein the communication slot controller sets the destination node whose communication error rate exceeds the threshold value as the specified destination node.

10. The device of claim 9, wherein unsent data is allocated to one of the retransmission slots or auxiliary retransmission slots for retransmission after a transmission of said unsent data through one of the communication slots has not been received by the specified destination node.

11. The device of claim 9, wherein unsent data is allocated to one of the retransmission slots or auxiliary retransmission slots for retransmission after a transmission of said unsent data through one of the communication slots when said communication slot does not receive an acknowledgement transmission from the specified destination node.

* * * * *